US012795768B2

(12) United States Patent
Zhang et al.

(10) Patent No.: US 12,795,768 B2
(45) Date of Patent: Nov. 10, 2026

(54) METHODS AND APPARATUS FOR DATA TRANSMISSION IN NEW RADIO (NR) INACTIVE STATE

(71) Applicant: MediaTek Singapore Pte. Ltd., Singapore (SG)

(72) Inventors: Yuanyuan Zhang, Beijing (CN); Chia-Chun Hsu, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 467 days.

(21) Appl. No.: 18/155,893

(22) Filed: Jan. 18, 2023

(65) Prior Publication Data

US 2023/0156847 A1 May 18, 2023

Related U.S. Application Data

(63) Continuation of application No. PCT/CN2021/109161, filed on Jul. 29, 2021, which is (Continued)

(51) Int. Cl.
*H04W 76/20* (2018.01)
*H04W 76/30* (2018.01)

(52) U.S. Cl.
CPC .......... *H04W 76/20* (2018.02); *H04W 76/30* (2018.02)

(58) Field of Classification Search
CPC .................................................. H04W 76/20
See application file for complete search history.

(56) References Cited

U.S. PATENT DOCUMENTS 10,314,005 B2 6/2019 Kim et al. ............ H04W 68/00
2018/0302914 A1* 10/2018 da Silva ............ H04W 72/1268
2020/0029206 A1 1/2020 Zhang
2021/0274525 A1* 9/2021 Wei .................. H04W 72/1268

FOREIGN PATENT DOCUMENTS

CN 106658758 2/2017
CN 106658758 A 5/2017
(Continued)

OTHER PUBLICATIONS

3GPP TSG-RAN WG2 #96, Ericsson, Baseline solution for small data transmission in RRC_INACTIVE, Tdoc R2-168713, pp. 1-7 (Year: 2016).*
(Continued)

*Primary Examiner* — Kouroush Mohebbi
(74) *Attorney, Agent, or Firm* — Helen Mao; Imperium Patent Works

(57) ABSTRACT

Apparatus and methods are provided for NR data transmission in the INACTIVE state. In one novel aspect, one or more data transmissions are performed in the UE INACTIVE state. The UE initiates the one or more data transmission in the INACTIVE state, restores the UE INACTIVE AS CONTEXT, performs the one or more data transmissions, and stops the data transmission upon detecting one or more preconfigured suspension conditions. In one embodiment, large sized data that cannot be carried by Msg3/MsgA are segmented. The UE multiplexes the BSR and the UL data in one MAC PDU and transmits the MAC PDU in the first UL transmission opportunity. In one embodiment, the UE goes to the CONNECTED state when one or more preconfigured fallback conditions are met. In another embodiment, the UE goes to the IDLE state when one or more preconfigured failure conditions are met.

20 Claims, 8 Drawing Sheets

Related U.S. Application Data a continuation of application No. PCT/CN2020/105444, filed on Jul. 29, 2020.

(56) References Cited

FOREIGN PATENT DOCUMENTS

| | | | |
|---|---|---|---|
| CN | 109952747 | A | 6/2019 |
| CN | 110383868 | A | 10/2019 |
| WO | 2018086600 | A1 | 5/2018 |
| WO | 2020148483 | A1 | 7/2020 |

OTHER PUBLICATIONS

"3rd Generation Partnership Project; Technical Specification Group Access Network; Evolved Universal Terrestrial Radio Access; RRC; Protocol specification (Release 16)".

International Search Report and Written Opinion of International Search Authority for PCT/CN2021/109161 dated Oct. 26, 2021 (9 pages).

Ericsson Baseline solution for small data transmission in RRC_INACTIVE 3GPP TSG-RAN WGZ #96 Tdoc R2-168713 Nov. 18, 2016 Section 2-3.

Huawei et al. UL data transmission in RRC_INACTIVE 3GPP TSG-RAN WG2 #96 R2-168544 Nov. 18, 2016 Section 2.1.1, 2.2-2.4.

China Intellectual Property Office Action 202180059076.X Dated Jul. 18, 2025 (No English translation available).

3GPP tsg_ran\tsg_ran, tsgr_86; Dec. 2, 2019; vivo, RP-192549 "Views on NR small data transmsision enhancements in Rel-17".

3GPP tsg_ran\WG2_RL2; Nov. 5, 2016; "R2-168713 Baseline solution for small data Tx in RRC_INACTIVE".

3GPP tsg_ran\WG2_RL2, TSGR2_96; Nov. 5, 2016; Huawei, HiSilicon, R2-168544 "UL data transmission in RRC_INACTIVE".

* cited by examiner

METHODS AND APPARATUS FOR DATA TRANSMISSION IN NEW RADIO (NR) INACTIVE STATE

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/109161, entitled "Methods and Apparatus for Data Transmission in New Radio (NR) Inactive State," filed on Jul. 29, 2021. International Application PCT/CN2021/109161, in turn, is filed under 35 U.S.C. § 111(a) and is based on and hereby claims priority under 35 U.S.C. § 120 and § 365(c) from International Application No. PCT/CN2020/105444, titled "Apparatus and methods to transmit data in NR Inactive State," with an international filing date of Jul. 29, 2020. The disclosure of each of the foregoing documents is incorporated herein by reference.

TECHNICAL FIELD

The disclosed embodiments relate generally to wireless communication, and, more particularly, to data transmission in new radio (NR) INACTIVE state.

BACKGROUND

The fifth generation (5G) radio access technology (RAT) will be a key component of the modern access network. It will address high traffic growth, energy efficiency and increasing demand for high-bandwidth connectivity. It will also support massive numbers of connected devices and meet the real-time, high-reliability communication needs of mission-critical applications. The 5G network introduces RRC INACTIVE state to reduce control plane and user plane latency. In the RRC INACTIVE state, the UE is always connected from the core network (CN) aspect so that the transition from the INACTIVE state to the CONNECTED state is more efficiency than from the IDLE state to the CONNECTED. However, the UE needs to perform state transition from INACTIVE to CONNECTED state and completes connection resume procedures first for any DL and UL data. The data transmission and reception are performed in the CONNECTED state. Connection setup and subsequently release to INACTIVE state happens for each data transmission. The transition comprises extensive signaling sequence between the UE and the network. When the amount of data that wireless devices exchange with the network is small and the data transmission is usually not urgent enough to justify the high battery consumption required to handle all the signaling involved in the legacy INACTIVE-to-CONNECTED transition.

Improvements are required to use the UE INACTIVE state more efficiently for small-data transmission and reception.

SUMMARY

Apparatus and methods are provided for NR data transmission in the INACTIVE state. In one novel aspect, one or more data transmissions are performed in the UE INACTIVE state. In one embodiment, the UE initiates the one or more data transmission in the INACTIVE state, restores the UE INACTIVE AS CONTEXT, performs the one or more data transmissions, and stops the data transmission upon detecting one or more preconfigured suspension conditions. In one embodiment, the UE INACTIVE AS CONTEXT has a set of parameters configured for data transmission in INACTIVE, which at least includes the configurations for physical layer and MAC layer. In one embodiment, one or multiple particular DRBs are configured by network, whose data packets can be transmitted in INACTIVE. In one embodiment, the DRB is resumed when a burst of data is to be transmitted; and the DRB is suspended when the transmission of data burst is finished. In another embodiment, one PDCP entity of the DRB supporting data transmission in INACTIVE maintains the PDCP SN among the multiple bursts data transmission in INACTIVE state. PDCP re-establishment is not performed when UE stays in INACTIVE state performing data transmission. In one embodiment, for the data transmission, the UE stays in the INACTIVE state and enables HARQ, DRX, UL time alignment (TA), buffer status report (BSR) and data inactivity monitoring. UE performs TA alignment procedure to obtain or maintain the UL time alignment. In one embodiment, large sized data that cannot be carried by Msg3/MsgA are segmented into different parts and carried in different transport blocks (TBs). The UE multiplexes BSR and UL data in one MAC PDU and transmits the MAC PDU in the first UL transmission opportunity. In one embodiment, the UE goes to the CONNECTED state when one or more preconfigured fallback conditions are met. In another embodiment, the UE goes to the IDLE state when one or more preconfigured failure conditions are met.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technology. NR may support various wireless communication services, such as enhanced mobile broadband targeting wide bandwidth, millimeter wave targeting high carrier frequency, massive machine type communications targeting non-backward compatible MTC techniques, and/or mission critical targeting ultra-reliable low-latency communications. These services may include latency and reliability requirements. These services may also have different transmission time intervals (TTI) to meet respective quality of service (QoS) requirements. In addition, these services may co exist in the same subframe.

Figure 1:
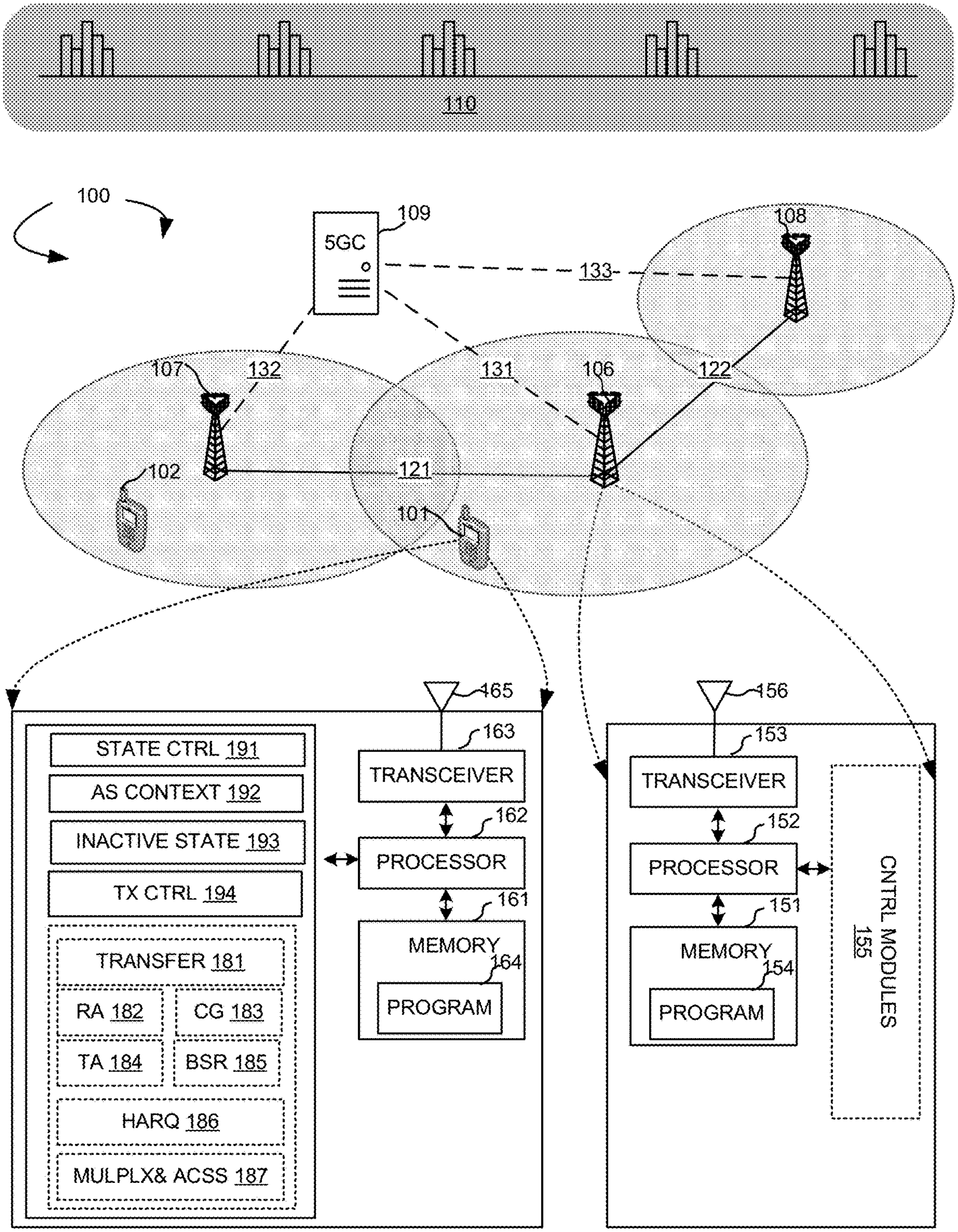
FIG. 1 is a schematic system diagram illustrating an exemplary wireless communication network 100 that supports NR data transmission in INACTIVE state.

FIG. 1 is a schematic system diagram illustrating an exemplary wireless communication network 100 that supports NR data transmission in INACTIVE state. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively. In one embodiment, UE 101 is configured to be able to transmit data in the INACTIVE state without the transition to CONNECTED state.

In one novel aspect, the UE initiates data transmission and/or reception in the INACTIVE state. In one embodiment, the data transmission is small-data transmission (SDT) as data bursts shown in a block 110. The NR network supports many services with infrequent and small-data packets. For example, traffic from instant messaging services, heartbeat/keep-alive traffic from IM/email clients and other apps and push notifications from various applications are the typical use cases of smart phone applications. For non-smartphone applications, traffic from wearables, sensors and smart meters/smart meter networks sending periodic meter readings are the typical use cases. For these small data shown in the block 110, the data transmission and/or reception are initiated in the INACTIVE state.

FIG. 1 further illustrates simplified block diagrams of a base station and a mobile device/UE for data transmission and reception in the INACTIVE state. FIG. 1 includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to a processor 162. In one embodiment, the RF transceiver 163 may comprise two RF modules (not shown). A first RF module is used for High Frequency (HF) transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. The Memory 161 also stores UE INACTIVE AS CONTEXT, which includes the current KgNB and KRRCint keys, the robust header compression (ROHC) state, the stored QoS flow to dedicated radio bearer (DRB) mapping rules, the cell radio network temporary identifier (C-RNTI) used in the source primary cell (PCell), the cellIdentity and the physical cell identity of the source PCell, and all other parameters. In one embodiment, the UE INACTIVE AS CONTEXT also has another set of parameters configured for data transmission in the INACTIVE state, which includes the configurations for physical layer and MAC layer. In one embodiment, the physical layer configuration includes pre-configured UL resources, which can be used for UL data transmission in the INACTIVE state. In one embodiment, the physical layer configuration includes an MAC configuration, e.g., MAC-CellGroupConfig. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. A state control module 191 initiates one or more data transmissions in a UE INACTIVE state in a wireless network. An AS context module 192 restores an INACTIVE AS context stored in the UE, wherein the INACTIVE AS context comprises an INACTIVE data transmission configuration. An inactive state control module 193 performs the one or more data transmissions in the UE INACTIVE state based on the INACTIVE AS context, wherein the one or more data transmissions uses one or more radio bearers (RB) selecting at least one from one or more dedicated RBs (DRBs) and one or more signaling RBs (SRBs). A transmission control module 194 stops the data transmission in the UE INACTIVE state upon detecting one or more preconfigured suspension conditions.

The control modules perform additional tasks to carry out the data transceiving in the INACTIVE state. A transfer of data 181 is performed at the PDCP layer. In one embodiment, the PDCP layer supports the functions of transfer of data, maintenance of PDCP SN, header compression and decompression using the ROHC protocol, ciphering and deciphering, integrity protection and integrity verification, timer-based service data unit (SDU) discard, routing for a split bearer, duplication, re-ordering and in-order delivery, out-of-order delivery and duplication discarding. In one embodiment, one PDCP entity of the DRB supporting data transmission in INACTIVE maintains the PDCP sequence number (SN) among the multiple data bursts transmission in the INACTIVE state. PDCP re-establishment is not performed when UE stays in INACTIVE state performing data transmission. In another embodiment, PDCP SN is maintained when UE performs a RRC state transition between the CONNECTED and the INACTIVE. PDCP re-establishment is not performed when UE performs a RRC state transition between the CONNECTED and the INACTIVE. In one embodiment, the RLC entity of the DRB is re-established upon each data burst transmission in the INACTIVE.

UE also includes multiple function modules in MAC layer that carry out different tasks in accordance with embodiments of the current invention. Random access (RA) module 182 controls and performs a random access. It supports a 2-step RA procedure and a 4-step RA procedure. Configuration grant (CG) module 183 performs data transmission on the pre-configured PUSCH resources. Time alignment (TA) module 184 controls and performs a UL time alignment procedure. Buffer status report (BSR) module 185 calculates the data amount available for transmission in L2 buffer and performs a BSR. In one embodiment, BSR 185 controls a scheduling request (SR) procedure. HARQ module 186 performs a HARQ process for one or multiple transport blocks (TBs). Multiplex and assembly module 187 performs a logical channel prioritization, multiplexes the data from multiple logical channels and generates the MAC protocol data units (PDUs).

FIG. 1 further includes simplified block diagrams of a gNB, such as gNB 106. gNB 106 has an antenna 156, which transmits and receives radio signals. An RF transceiver circuit 153, coupled with the antenna 156, receives RF signals from antenna 156, converts them to baseband signals, and sends them to a processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. The set of control modules 155 includes a RRC state controller, a DRB controller, an INACTIVE AS CONTEXT controller, and a protocol controller. The RRC state controller controls UE's RRC state by sending a command to UE or providing configurations for the state transition conditions. The DRB controller suspends or resumes the DRBs of a UE. In one embodiment, the DRB is resumed when a burst of data is to be transmitted. The DRB is suspended when the transmission of data burst is finished. The INACTIVE AS CONTEXT manages to store, restore, or release the UE INACTIVE AS CONTEXT. The protocol controller controls the establishment, re-establishment, release, reset, configuration of the user plane protocols including PDCP, RLC and MAC. In one embodiment, the SDAP layer is optionally configured. The gNB also includes multiple function modules in MAC layer that carry out different tasks in accordance with embodiments of the current invention. An RA module performs a random access for a UE. It supports a 2-step RA procedure and a 4-step RA procedure. A CG module receives data on the pre-configured PUSCH resources. A TA module controls and performs a UL time alignment procedure for a UE. A HARQ module performs a HARQ process for one or multiple TBs. An assistant information module receives assistant information from the UE for scheduling. A De-multiplex and de-assembly module de-multiplexes and de-assembles the MAC PDUs received from the UE.

Figure 2:
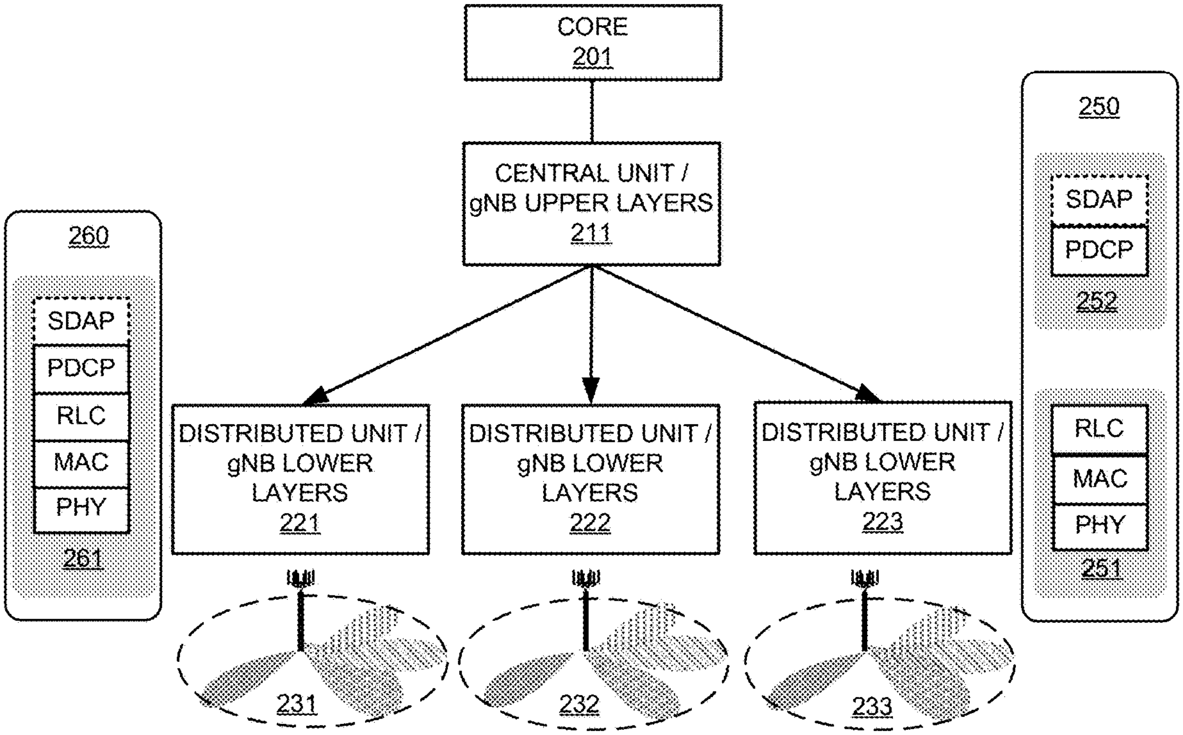
FIG. 2 illustrates an exemplary NR wireless system with centralized upper layers of the NR radio interface stacks.

FIG. 2 illustrates an exemplary NR wireless system with centralized upper layers of the NR radio interface stacks and UE protocol stacks with multicast protocols and unicast protocols. Different protocol split options between central unit (CU) and distributed unit (DU) of gNB may be possible. The functional split between the CU and DU of gNB may depend on transport layer. Low performance transport between the CU and DU of gNB can enable higher protocol layers of the NR radio stacks to be supported in the CU, since the higher protocol layers have lower performance requirements on the transport layer in terms of bandwidth, delay, synchronization, and jitter. In one embodiment, SDAP and PDCP layers are located in the CU, while RLC, MAC and PHY layers are located in the DU. A core unit 201 is connected with a central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has a protocol stack 261 including SDAP, PDCP, RLC, MAC and PHY layers.

Figure 3:
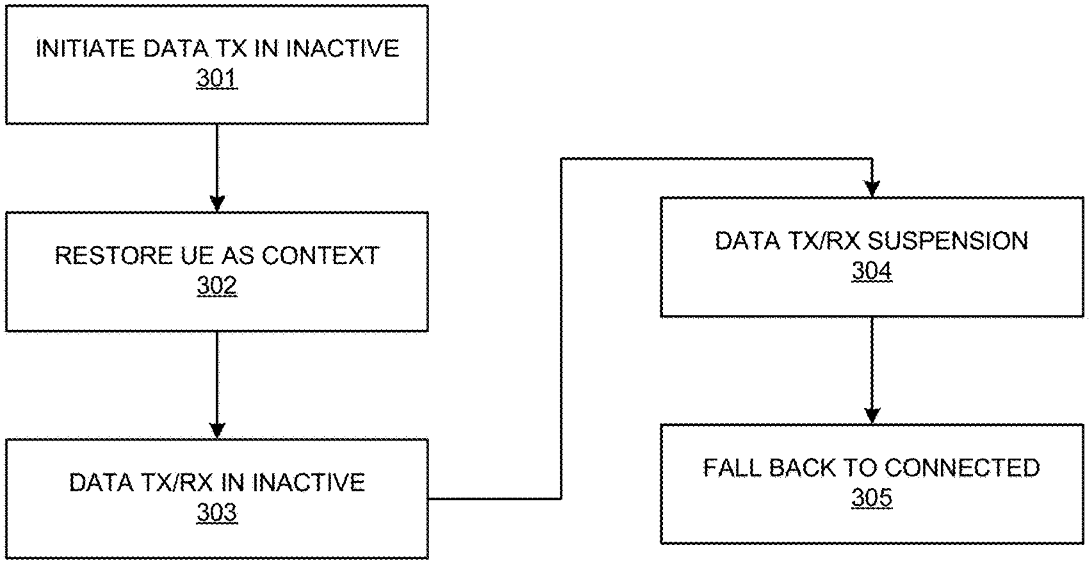
FIG. 3 illustrates an exemplary top-level flow diagram for the INACTIVE state data transmission with data suspension and fallback procedures.

FIG. 3 illustrates an exemplary top-level flow diagram for the INACTIVE state data transmission with data suspension and fallback procedures. At step 301, the UE initiates data transmission in the INACTIVE state. At step 302, the UE restores the stored UE INACTIVE AS context. The INACTIVE AS context comprises an INACTIVE data transmission configuration. The UE does not need to resume a RRC connection and go to the CONNECTED state for data transmission. After the initiation procedure, at step 303, the UE performs one or more data transmissions and optionally receptions in the INACTIVE state. The one or more data transmissions uses one or more radio bearers (RB), selecting at least one from one or more dedicated RBs (DRBs) and one or more signaling RBs (SRBs). In one embodiment, the one or more data transmissions involves a resource procedure selecting from a random access (RA) procedure, using a preconfigured UL resources of a configuration grant (CG) procedure, and monitoring physical downlink control channel (PDCCH) addressed to cell radio network temporary identifier (C-RNTI) procedure. If the UE detects one or more preconfigured suspension conditions, such as the transmission of all the data in the buffer is completed, at step 304, the UE stops the data transmission and stays in INACTIVE state. The one or more preconfigured suspension conditions triggers UE suspension and/or stop procedures. In one embodiment, the one or more preconfigured suspension conditions comprise receiving a command from the wireless network indicating a suspension of the one or more DRBs, a layer-2 (L2) buffer is empty, a suspension indication received from an upper layer of the UE, an expiration of a data-inactivity timer, a maximum number of new transport block (TB) transmission is not reached when a L2 buffer is empty. If the UE detects one or more preconfigured fallback conditions, such as more data arrives or a command is received e.g., RRCResume message from the network to go to CONNECTED, at step 305, the UE may fall back to the procedure to resume RRC connection. In one embodiment, the one or more preconfigured fallback conditions comprise receiving a command from the wireless network to go to CONNECTED state, the amount of continuous data packets arrival exceeds a preconfigured fallback threshold, a state transition to the CONNECTED state indication received from an upper layer of the UE, a maximum number of new transport block (TB) transmission is reached when a L2 buffer is not empty.

Figure 4:
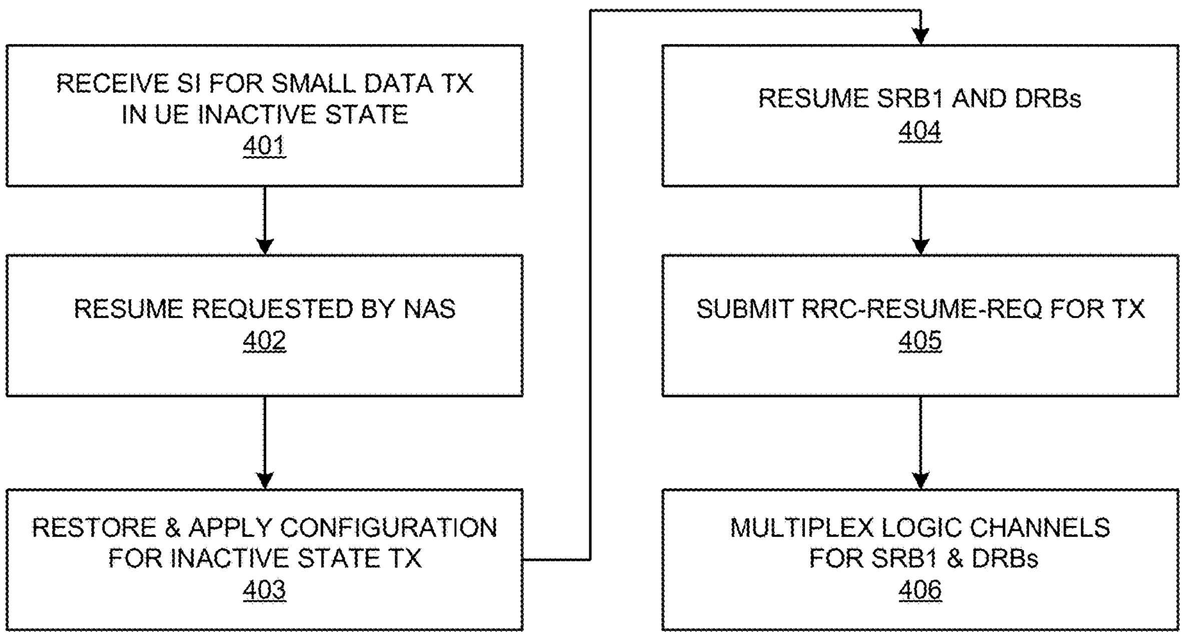
FIG. 4 illustrates an exemplary flow diagram for initiation of data transmission in the INACTIVE state with both SRB and DRBs.

FIG. 4 illustrates an exemplary flow diagram for initiation of data transmission in the INACTIVE state with both SRB and DRBs. In one embodiment, initiating data transmission in the INACTIVE state is triggered by a resume request from a non-access stratum (NAS) layer when an amount of data to be transmitted is lower than a preconfigured small-data threshold. In one embodiment, the resume request was received by a radio resource control (RRC) layer of the UE, and wherein the UE multiplexes a RRCResumeRequest with a buffer status report (BSR) for the data transmission in the INACTIVE state. In another embodiment, a data packet is also multiplexed together with the RRCResumeRequest in the BSR in one MAC PDU. At step 401, the UE in the INACTIVE state receives system information for data transmission. In one embodiment, the system information provides configuration for UE to initiate small data transmission in INACTIVE. The threshold of data amount is provided in the system information. In one embodiment, at step 402, the RRC layer of UE receives the resume requested by NAS layer. If the amount of data available for transmission is less than the threshold, UE can initiate data transmission in INACTIVE. Otherwise, UE needs to initiate a resume procedure to go to the CONNECTED state for data transmission. At step 403, the UE restores the UE INACTIVE AS CONTEXT and applies the configuration including the security keys, the ROHC state, the stored QoS flow to DRB mapping rules, the C-RNTI used in the source PCell, the cellIdentity and the physical cell identity of the source PCell, and all other parameters configured for data transmission in the INACTIVE state. At step 404, the UE resumes SRB1 and the DRBs, which are configured to be able to transmit data in the INACTIVE state. In one embodiment, UE may resume SRB1 for SDT of smart phone applications cases. At step 405, the UE submits RRCResumeRequest to a lower layer (e.g., MAC layer) for data transmission. At step 406, MAC layer multiplexes the logical channels common control channel (CCCH) carrying RRCResumeRequest and, optionally, the dedicated traffic channel (DTCH) carrying DRBs, which have data for transmission in the INACTIVE state.

Figure 5:
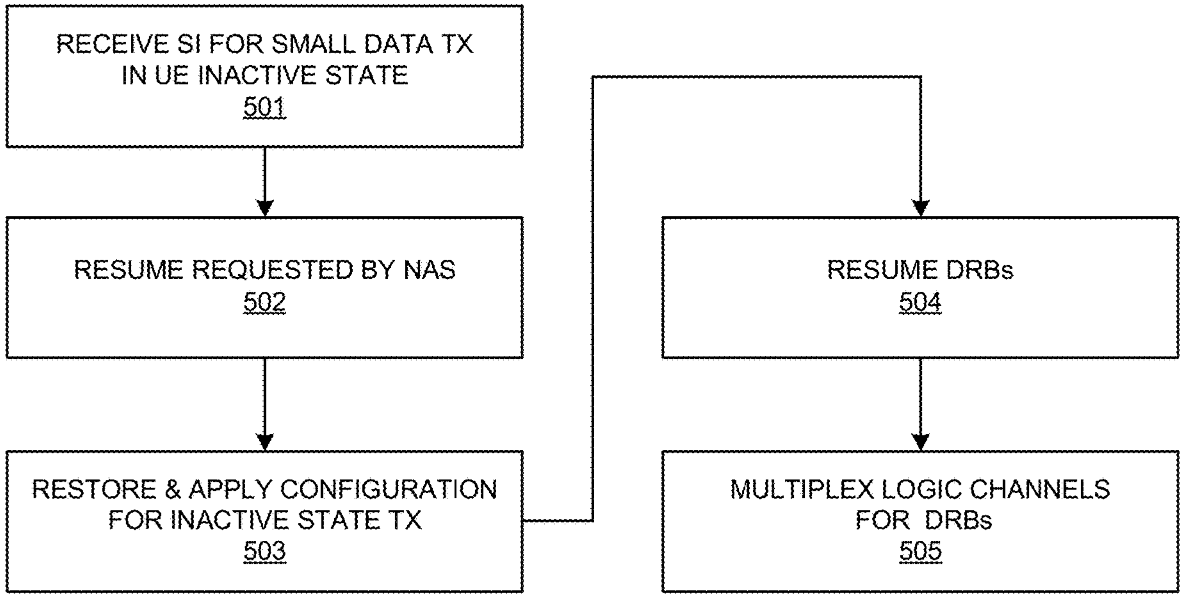
FIG. 5 illustrates an exemplary flow diagram for initiation of data transmission in the INACTIVE from the user plane with DRBs.

FIG. 5 illustrates an exemplary flow diagram for initiation of data transmission in the INACTIVE from the user plane with DRBs. In one embodiment, the initiating data transmission in the INACTIVE state is triggered by a resume request from a NAS layer when an amount of data to be transmitted is lower than a preconfigured small-data threshold. In one embodiment, the resume request was received by a user plane entity of the UE. In one embodiment, one or more data packets are multiplexed together with a BSR. At step 501, the UE in the INACTIVE state receives system information. In one embodiment, the system information provides configuration for UE to initiate small data transmission in INACTIVE. The threshold of data amount is provided in the system information. In one embodiment, at step 502, the user plane of UE receives the resume requested by NAS layer. If the amount of data available for transmission is less than the threshold, UE can initiate data transmission in INACTIVE. Otherwise, UE needs to initiate a RRC resume procedure to go to the CONNECTED state for data transmission. At step 503, the UE restores the UE INACTIVE AS CONTEXT and applies the configuration including the security keys, the ROHC state, the stored QoS flow to DRB mapping rules, the C-RNTI used in the source PCell, the cellIdentity and the physical cell identity of the source PCell, and all other parameters configured for data transmission in the INACTIVE state. At step 504, the UE resumes DRBs, which are configured to be able to transmit data in INACTIVE. In one embodiment, UE may resume DRBs for SDT of non-smartphone applications cases. At step 505, the MAC layer multiplexes the logical channel DTCH carrying DRBs, which have data for transmission in the INACTIVE state.

Figure 6:
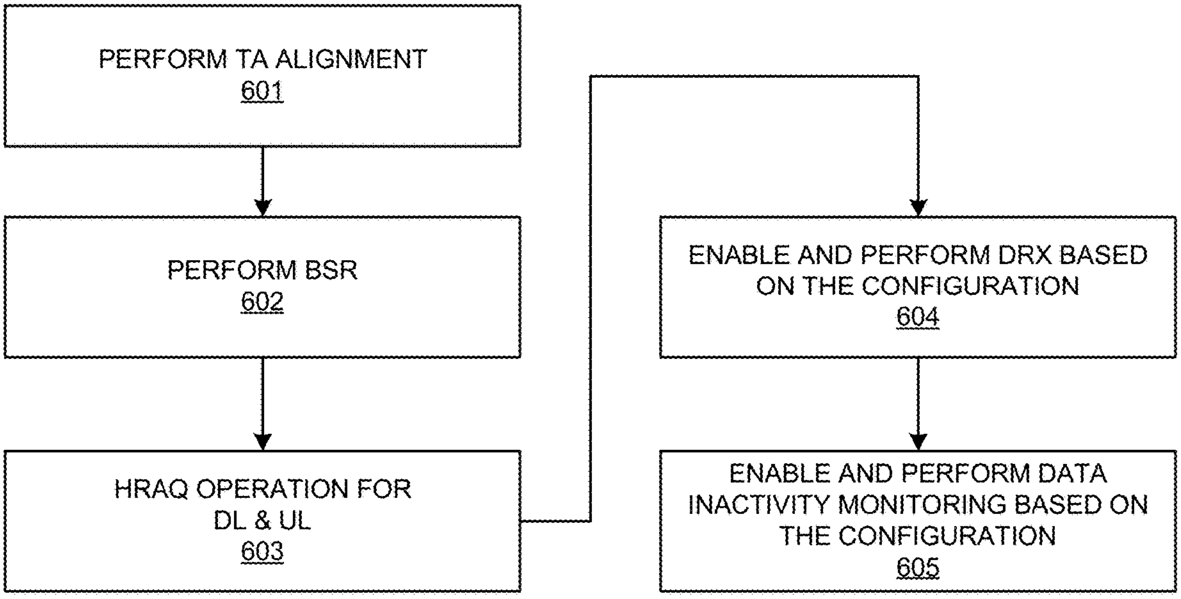
FIG. 6 illustrates an exemplary flow diagram for performing the data transmission procedure in the INACTIVE state.

FIG. 6 illustrates an exemplary flow diagram for performing the data transmission procedure in the INACTIVE state. In one novel aspect, UE stays in INACTIVE and enables HARQ, DRX, UL time alignment, BSR and data inactivity monitoring. At step 601, the UE performs a TA procedure to obtain or maintain the UL time alignment. If the TA timer expires, the UE needs to initiate RA procedure to acquire the UL time alignment. At step 602, the UE performs BSR procedure to send BSR to the network. If there is no UL grant available, UE will initiate SR procedure. At step 603, the UE performs HARQ operation for one or more shots transmission, for example, via a signaling from the base station. At step 604, the UE enables and performs DRX if DRX for data transmission in INACTIVE is configured. At step 605, the UE performs data inactivity monitoring if DataInactivityTimer for data transmission in INACTIVE is configured.

Figure 7:
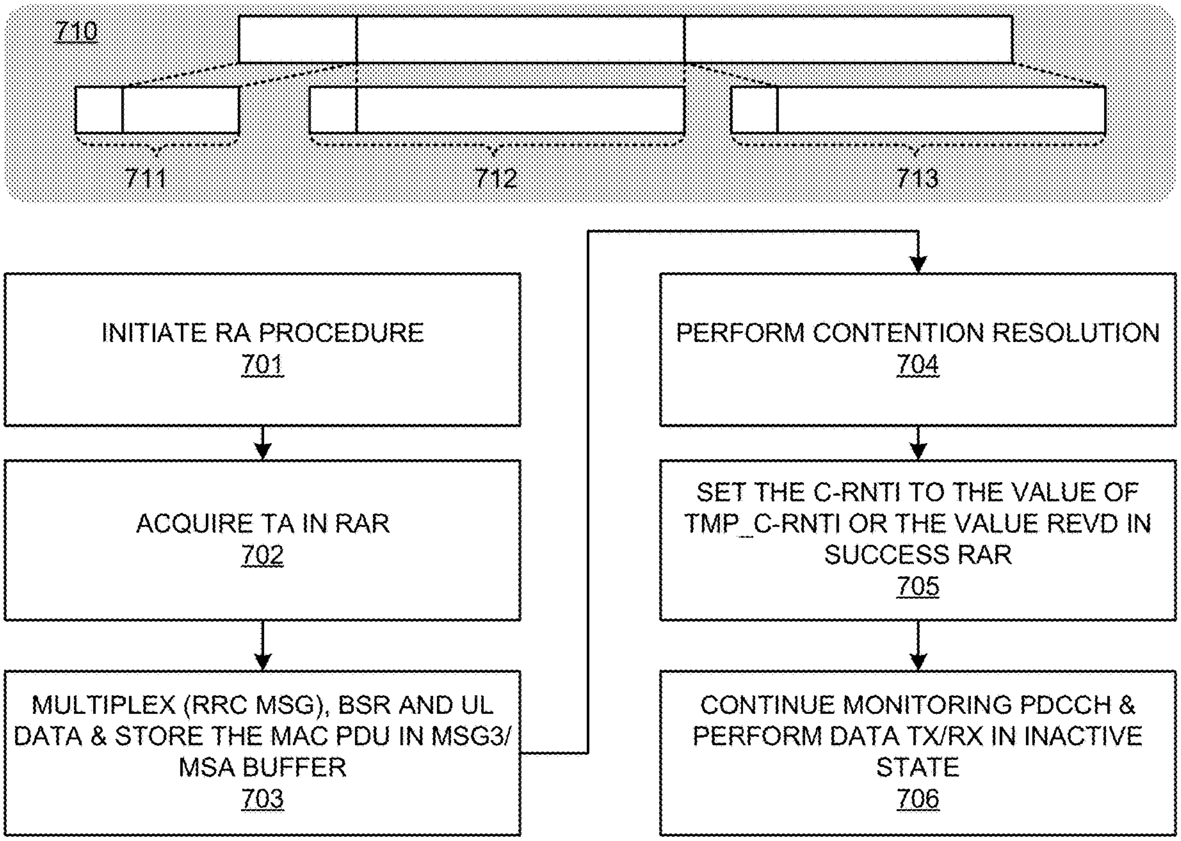
FIG. 7 illustrates an exemplary flow diagram for performing the data transmission in multiple shots with RA procedure in INACTIVE state.

FIG. 7 illustrates an exemplary flow diagram for performing the data transmission in multiple shots with RA procedure in the INACTIVE state. In one novel aspect, the data available for transmission in L2 is large and cannot be carried by Msg3/MsgA. The overall data packets, as in 710, are segmented into different parts and carried in different transport blocks (TBs) 711, 712, and 713. At step 701, the UE initiates a RA procedure. At step 702, the UE acquires TA in a Random Access Response (RAR). At step 703, the UE multiplexes a BSR and UL data in one MAC PDU and stores the MAC PDU in a Msg3/MsgA buffer. In one embodiment, UE multiplexes RRC message (e.g., RRCResumeReqest), the BSR and the UL data optionally in the first UL transmission opportunity. At step 704, the UE performs a contention resolution. If the contention is resolved, at step 705, UE sets the C-RNTI as the value of the TEMPORARY_C-RNTI (4-step RA) or the value received in the successRAR (2-step RA). At step 706, the UE continues monitoring PDCCH and performs data transmission/reception in INACTIVE. In one embodiment, UE may monitor PDCCH addressed to C-RNTI for data transmission.

Figure 8:
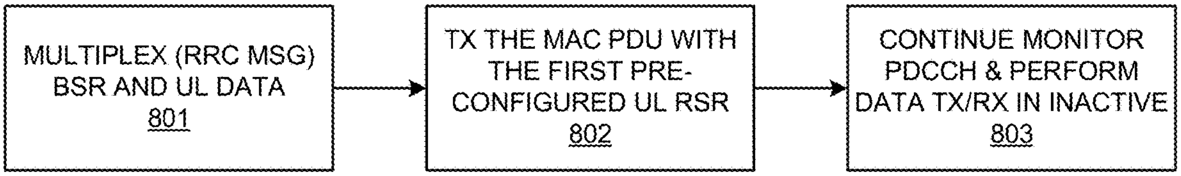
FIG. 8 illustrates an exemplary flow diagram for performing the data transmission in multiple shots with preconfigured UL resources in INACTIVE state.

FIG. 8 illustrates an exemplary flow diagram for performing the data transmission in multiple shots with preconfigured UL resources in the INACTIVE state. In one novel aspect, the data available for transmission in L2 is large and cannot be carried by Msg3/MsgA. The overall data packets are segmented into different parts and carried in different transport blocks (TBs), as exemplary shown in 710. At step 801, the UE multiplexes a BSR and UL data in one MAC PDU and transmits the MAC PDU in the first UL transmission opportunity. At step 802, the UE transmits the MAC PDU in the first UL transmission opportunity. In other words, the MAC PDU is transmitted with the first preconfigured UL resource, e.g., preconfigured UL resources of CG procedure. At step 803, the UE continues monitoring PDCCH and performs data transmission/reception in INACTIVE.

Figure 9:
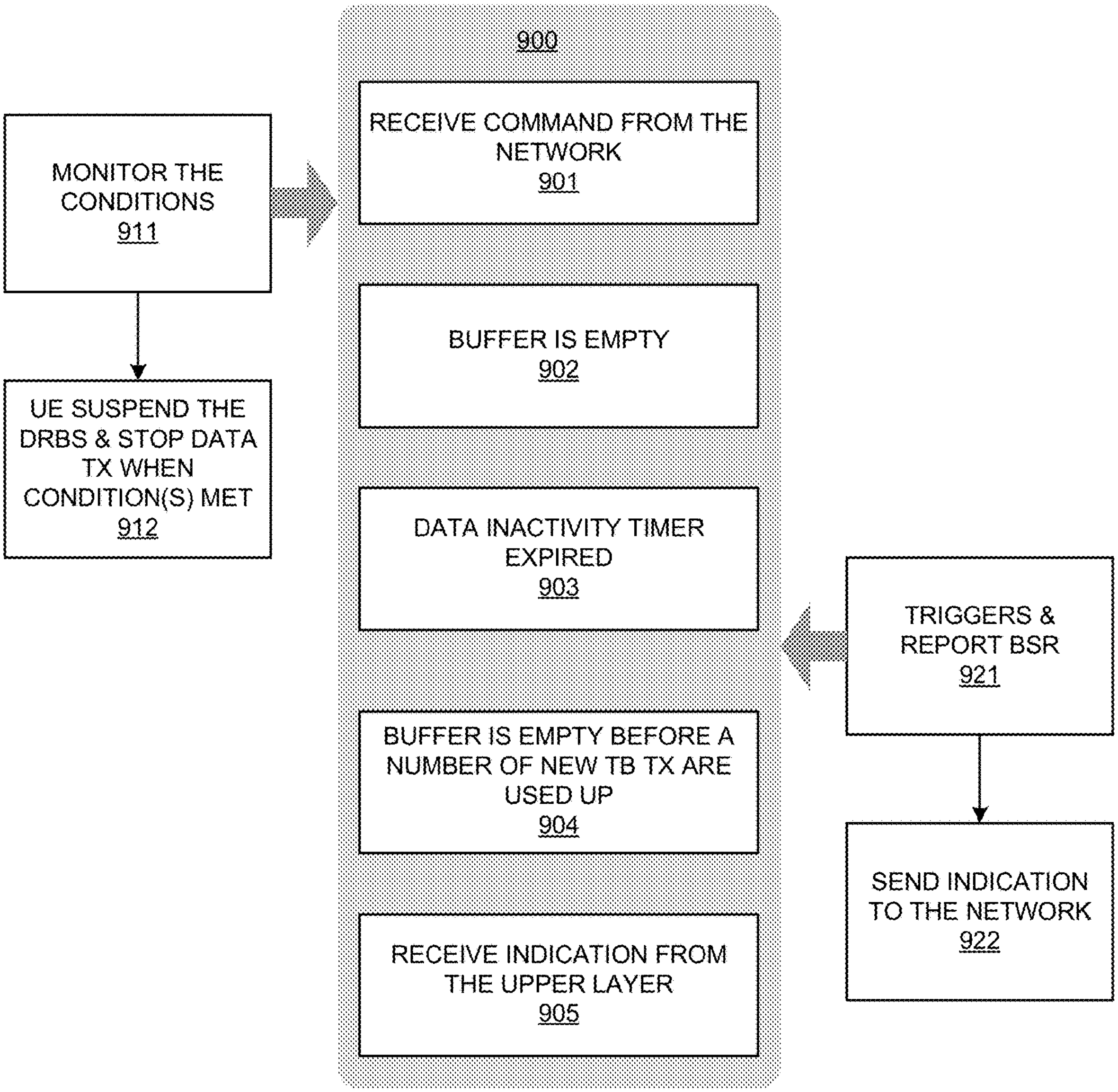
FIG. 9 illustrates exemplary flow diagrams for the procedure to stop data transmission in the INACTIVE state.

FIG. 9 illustrates exemplary flow diagrams for the procedure to stop data transmission in the INACTIVE state. In one embodiment, the UE suspends or stops data transmission in the INACTIVE state upon detecting one or more preconfigured suspension conditions 900. At step 911, the UE monitors the suspension conditions to suspend data transmission. When one of the suspension conditions is met, at step 912, the UE suspends the DRBs configured with data transmission in INACTIVE and stops data transmission. In one embodiment, the suspension is controlled by network. The suspension condition 901 is a command received from the network. For example, the command is RRCRelease message, which responds the RRCResumeRequest transmitted by UE before. In another embodiment, the suspension is controlled by UE. The conditions are evaluated by the UE itself. A suspension condition 902 is that the L2 buffer is empty. In one embodiment, the threshold number of new TB transmission opportunities N is configured. Another suspension condition 903 is that the DataInactivityTimer expires, which implies that UE has no data for transmission/reception for a while. A suspension condition 904 is that the L2 buffer is empty before the number of new transmission opportunities are used up. A suspension condition 905 is that an indication is received from the upper layer, indicating that there is no further uplink or downlink data transmission is expected. In another embodiment, the upper layer indication indicates that there is no further uplink or downlink data transmission and no further uplink data transmission subsequent to the uplink data transmission is expected. In another embodiment, at step 921, the UE triggers and sends a BSR with the value '0' to the network. In one embodiment, at step 922, the UE sends an indication to the network when one of the conditions evaluated by the UE is satisfied. In one embodiment, UE receives RRCRelease message and stays in INACTIVE state.

Figure 10:
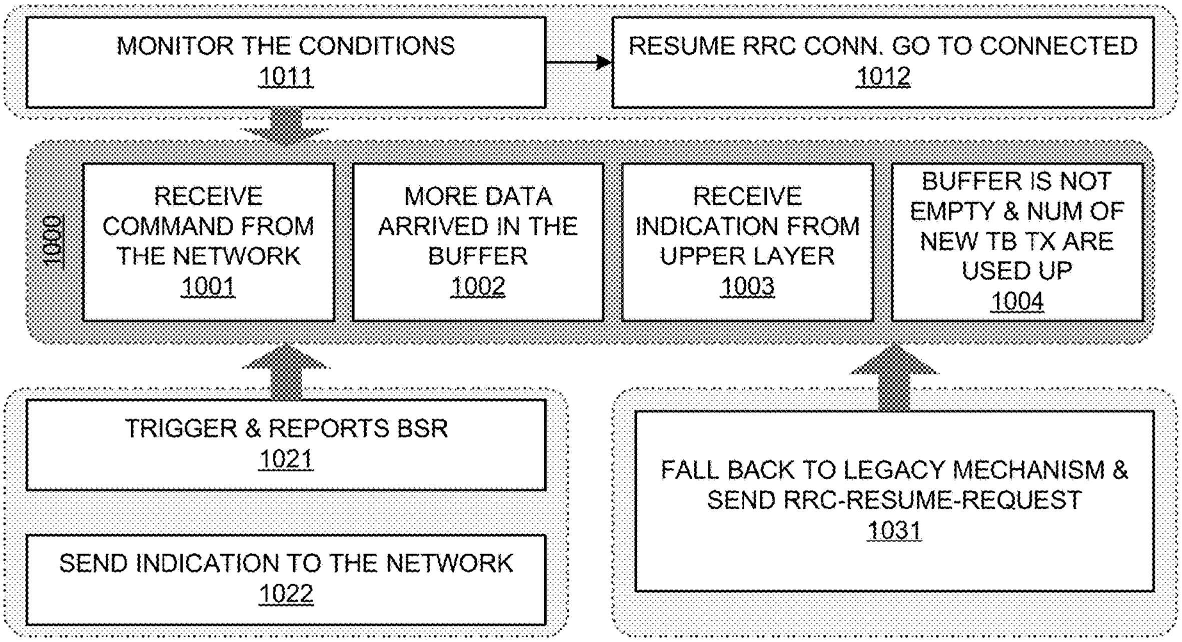
FIG. 10 illustrates exemplary flow diagrams for the fall back to RRC resume procedure and go to CONNECTED state.

FIG. 10 illustrates exemplary flow diagrams for the fall back to RRC resume procedure and go to CONNECTED state. One or more conditions 1000 are configured for the UE. At step 1011, the UE monitors the fallback conditions to resume a RRC connection. When the condition is met, at step 1012, the UE resumes the RRC connection and go to the CONNECTED state for further data transmission. In one embodiment, RRC connection resume is controlled by network. A fallback condition 1001 is that a command is received from the network. In one embodiment, the command is RRCResume message which responds the RRCResumeRequest transmitted by UE before. In one embodiment, RRC connection resume is controlled by UE. Therefore, the conditions are evaluated by the UE itself. A fallback condition 1002 is that the more data arrives in the L2 buffer. In other words, the amount of data arrives in the L2 buffer exceeds a preconfigured fallback threshold. A fallback condition 1003 is that an indication is received from the upper layer, indicating a state transition to CONNECTED state. A fallback condition 1004 is that the L2 buffer is not empty before the number of new transmission opportunities are used up. In one embodiment, at step 1021, the UE triggers and reports a BSR to the network. In another embodiment, at step 1022, the UE sends an indication to the network when one of the conditions evaluated by itself is satisfied. In one embodiment, UE receives RRCResume message from the network. In one embodiment, when one or more preconfigured fallback conditions are satisfied, at step 1031, the UE fallbacks to the legacy mechanism and initiates a RRC resume procedure by transiting RRCResumeRequest message.

Figure 11:
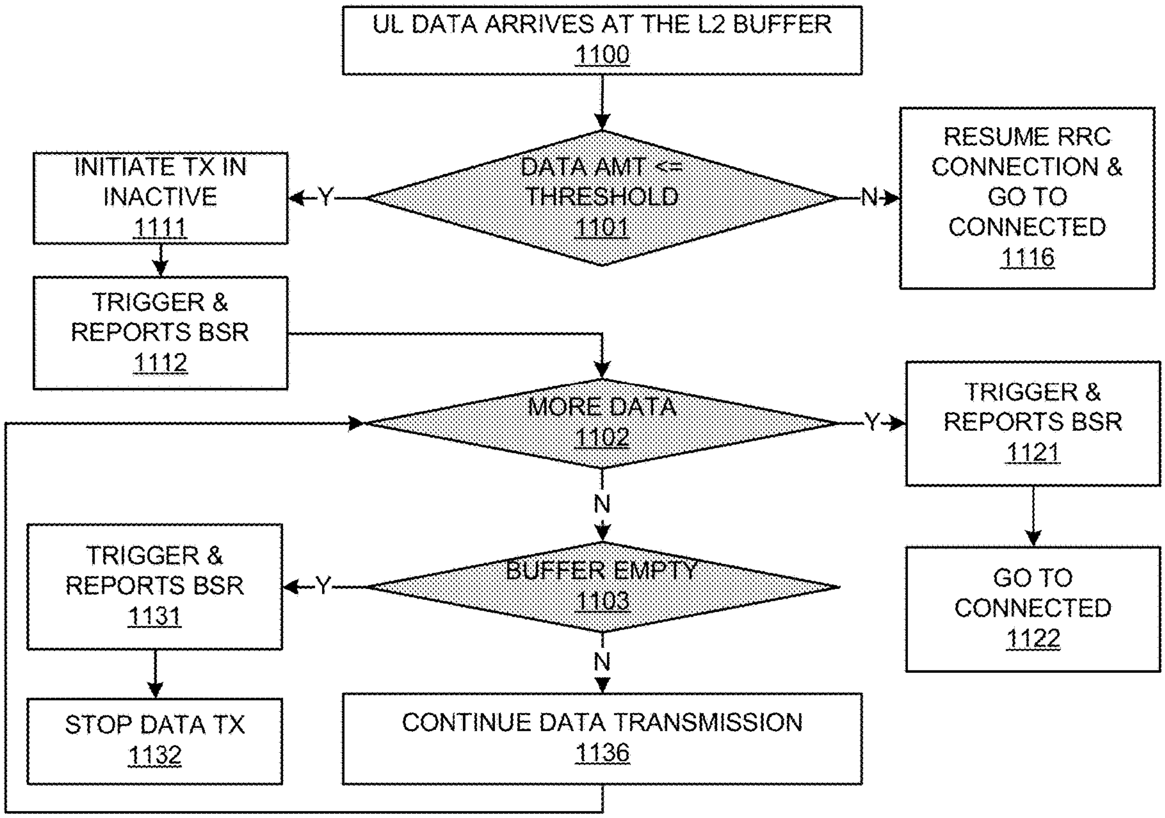
FIG. 11 illustrates exemplary flow diagrams for triggering and reporting BSR procedures with data transmission in the INACTIVE state.

FIG. 11 illustrates exemplary flow diagrams for triggering and reporting BSR procedures with data transmission in the INACTIVE state. In one embodiment, at step 1100, UL data arrives at the L2 buffer in the UE. At step 1101, the UE determines if the amount of data to be transmitted is smaller than or equal to a preconfigured data amount threshold. If step 1101 determines no, at step 1116, the UE resumes RRC connection and goes to the CONNECTED state. If step 1101 determines yes, the UE at step 1111, initiates data transmission in the INACTIVE state. At step 1112, the UE triggers and reports BSR. Subsequently, at step 1102, the UE determines if there is more data. If step 1102 determines yes, the UE, at step 1121, triggers and send the BSR. At step 1122, the UE goes to the CONNECTED state. In one embodiment, the network sends RRCResume message to UE. If step 1102 determines no, the UE, at step 1103, determines if the buffer is empty. If step 1103 determines no, the UE, at step 1135 continues data transmission and goes back to step 1102 and determines if there is more data. If step 1103 determines yes, the UE, at step 1131, triggers and reports BSR. At step 113, the UE stops data transmission. Please note that in other embodiments, BSR reports are not triggered.

Figure 12:
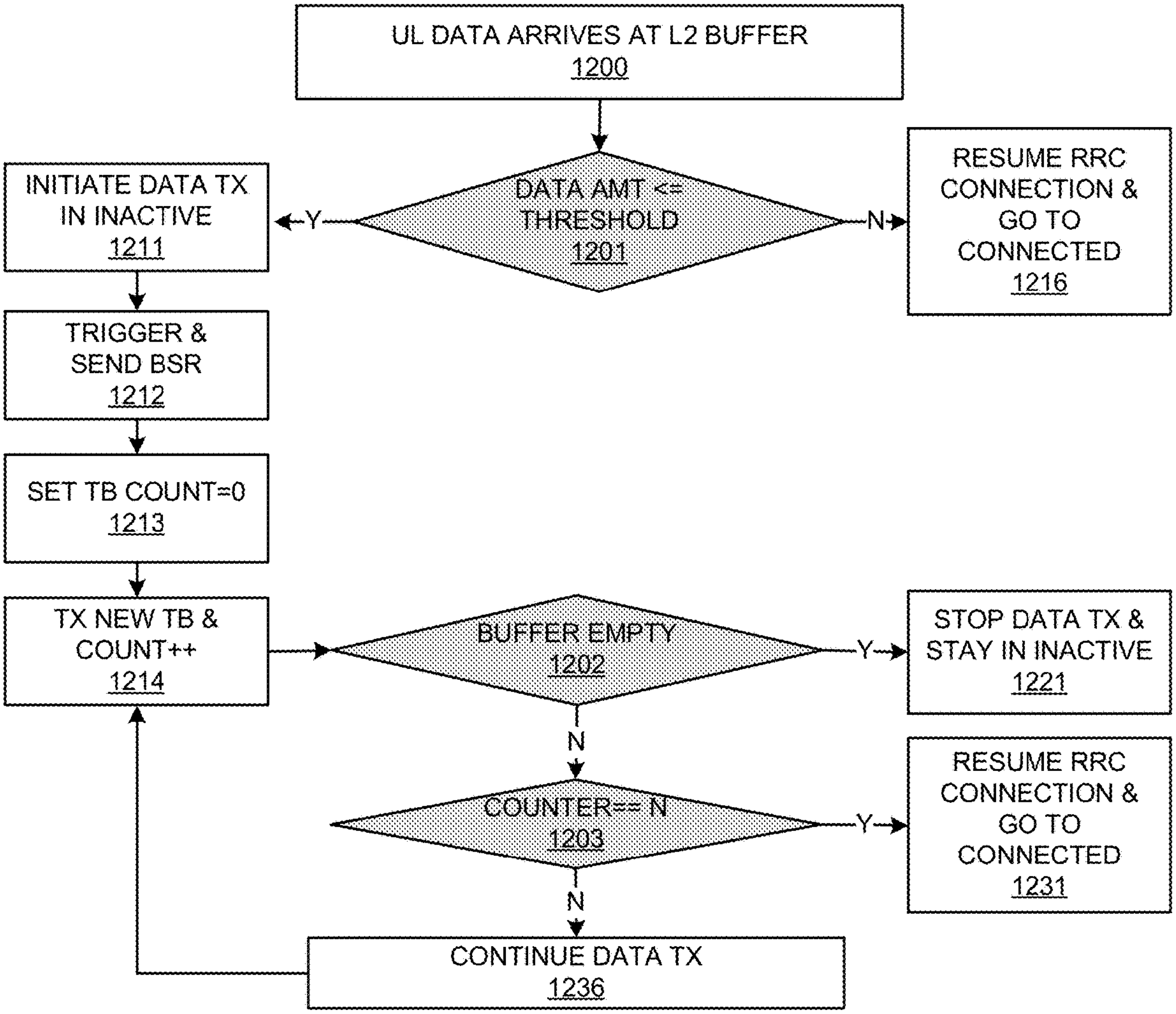
FIG. 12 illustrates exemplary flow diagrams for different procedures based on the amount of data available for transmission with data transmission in the INACTIVE state.

FIG. 12 illustrates exemplary flow diagrams for different procedures based on the amount of data available for transmission with data transmission in the INACTIVE state. When UL data arrives at the L2 buffer, at step 1200, the UE calculates the data amount. At step 1201, the UE determines whether the amount of data available for transmission is larger than the threshold configured by network. If step 1201 determines yes, at step 1216, the UE resumes RRC connection and go to the CONNECTED state. Otherwise, at step 1211, the UE initiates data transmission in the INACTIVE state. Since new data arrives in the buffer, at step 1212, the UE triggers and sends BSR to the network. At step 1213, the number of new TBs transmission N is configured. At step 1214, a counter is set to zero as the initial value. The counter is increased by one for each new TB transmission. At step 1202, the UE determines if the buffer is empty. If step 1202 determines the L2 buffer is empty, the UE triggers BSR and send it to the network. In one embodiment, at step 1221, the UE stops data transmission and stays in the INACTIVE state. In another embodiment, the UE receives RRCRelease message and stops data transmission and stays in the INACTIVE state. If step 1202 determines the L2 buffer is not empty, at step 1203, the UE checks whether the maximum number of new TB transmission is reached (whether the counter value==N). If step 1203 determines yes, at step 1231, the UE resumes the RRC connection and goes to the CONNECTED state for data transmission. In one embodiment, UE receives RRCResume message and the UE resumes RRC connection and goes to CONNECTED for data transmission. In another embodiment, UE initiates a RRC connection resume procedure. If step 1203 determines no, the UE, at step 1236 continues data transmission in the INACTIVE state and continue monitors the counter and the buffer.

Figure 13:
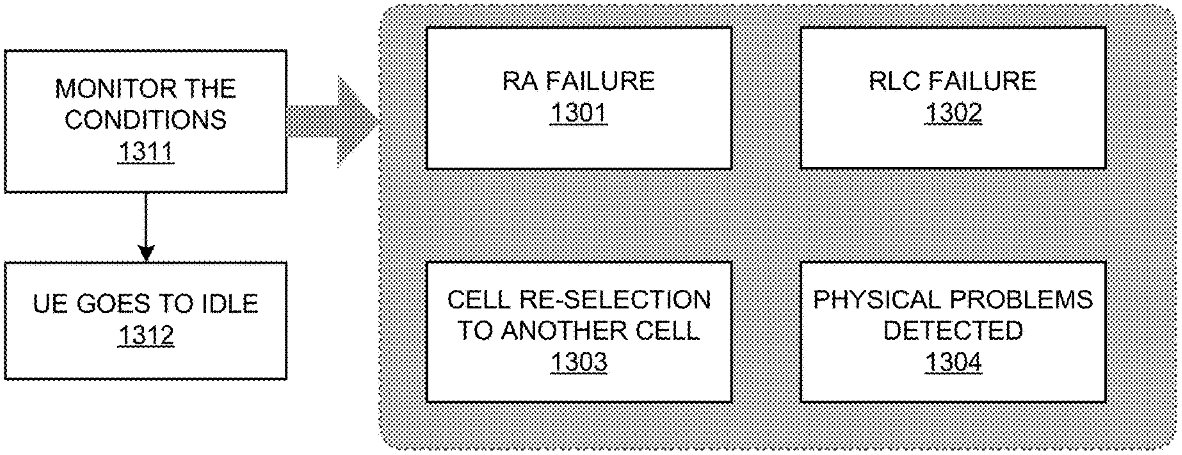
FIG. 13 illustrates exemplary flow diagrams for the UE to go to IDLE state from the INACTIVE state upon detecting one or more failure conditions.

FIG. 13 illustrates exemplary flow diagrams for the UE to go to IDLE state from the INACTIVE state upon detecting one or more failure conditions. In one embodiment, the UE performs a state transition from the INACTIVE state to an IDLE state upon detecting one or more preconfigured failure conditions. In one embodiment, the one or more preconfigured failure conditions comprise an RA failure, an RLC failure, and detection of one or more physical problems. At step 1311, the UE monitors one or more preconfigured failure conditions. At step 1312, the UE goes to the IDLE condition if the one or more failure conditions are met. If RA procedure fails (condition 1301), the UE goes to IDLE. If RLC failure occurs (condition 1302), i.e., successful reception of a RLC PDU has not been confirmed after the maximum transmission number is reached, UE goes to IDLE. If the UE performs a cell re-selection to another cell (condition 1303), the UE goes to IDLE state. If the physical problem is detected (condition 1304) in the INACTIVE state, the UE goes to the IDLE state.

Figure 14:
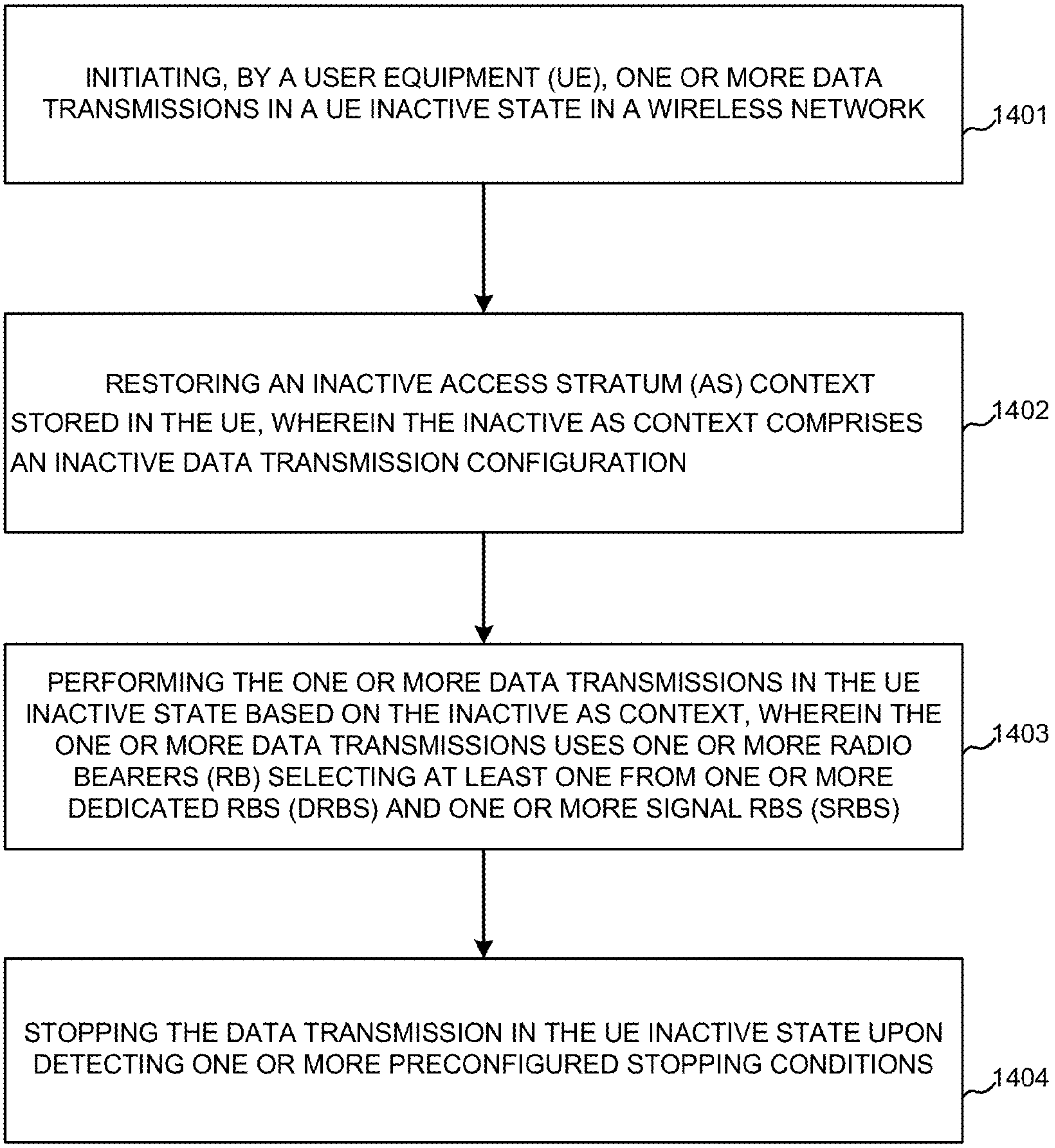
FIG. 14 illustrates an exemplary flow chart for the data transmission in the INACTIVE state.

FIG. 14 illustrates an exemplary flow chart for the data transmission in the INACTIVE state. At step 1401, the UE initiates one or more data transmissions in a UE INACTIVE state in a wireless network. At step 1402, the UE restores an INACTIVE access stratum (AS) context stored in the UE, wherein the INACTIVE AS context comprises an INACTIVE data transmission configuration. At step 1403, the UE performs the one or more data transmissions in the UE INACTIVE state based on the INACTIVE AS context, wherein the one or more data transmissions uses one or more radio bearers (RB) selecting at least one from one or more dedicated RBs (DRBs) and one or more signaling RBs (SRBs). At step 1404, the UE stops the data transmission in the UE INACTIVE state upon detecting one or more preconfigured stopping conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

initiating, by a user equipment (UE), one or more data transmissions in a UE INACTIVE state in a wireless network;

restoring an INACTIVE access stratum (AS) context stored in the UE, wherein the INACTIVE AS context comprises a set of parameters configured for data transmission in the INACTIVE state, which includes physical layer and MAC layer configurations;

performing the one or more data transmissions in the UE INACTIVE state based on the INACTIVE AS context, wherein the one or more data transmissions uses one or more radio bearers (RB) selecting at least one from one or more dedicated RBs (DRBs) and one or more signaling RBs (SRBs), wherein the set of parameters including the physical layer and MAC layer configurations are applied in response to initiating the one or more data transmissions in the UE INACTIVE state; and stopping the data transmission in the UE INACTIVE state upon detecting one or more preconfigured suspension conditions.

2. The method of claim 1, wherein the initiating data transmission in the INACTIVE state is triggered by a resume request from a non-access stratum (NAS) layer when an amount of data to be transmitted is lower than a preconfigured small-data threshold.

3. The method of claim 2, wherein the resume request was received by a user plane entity of the UE.

4. The method of claim 2, wherein the resume request was received by a radio resource control (RRC) layer of the UE, and wherein the UE multiplexes a RRCResumeRequest with a buffer status report (BSR) for the data transmission in the INACTIVE state.

5. The method of claim 4, wherein a data packet is multiplexed together with the RRCResumeRequest and the BSR in one MAC PDU.

6. The method of claim 1, wherein the performing the one or more data transmissions comprises one or more procedures comprising a Discontinuous Reception (DRX), a hybrid automatic repeat request (HARQ), an uplink (UL) time alignment (TA), a BSR and a data inactivity monitoring, and an UL data packets segmentation.

7. The method of claim 1, wherein the performing the one or more data transmissions involves a resource procedure selecting from a random access (RA) procedure, using preconfigured UL resources of a configuration grant (CG) procedure, and monitoring a physical downlink control channel (PDCCH) addressed to cell radio network temporary identifier (C-RNTI) procedure.

8. The method of claim 1, wherein the one or more preconfigured suspension conditions comprise receiving a command from the wireless network indicating a suspension of the one or more DRBs, a layer-2 (L2) buffer is empty, a suspension indication received from an upper layer of the UE, an expiration of a data-inactivity timer, a maximum number of new transport block (TB) transmission is not reached when a L2 buffer is empty.

9. The method of claim 8, wherein the command from the wireless network is an RRCRelease message.

10. The method of claim 1, further comprising performing a state transition from the INACTIVE state to a CONNECTED state upon detecting one or more preconfigured fallback conditions.

11. The method of claim 10, wherein the one or more preconfigured fallback conditions comprise receiving a command from the wireless network to go to CONNECTED state, an amount of continuous data packets arrival exceeds a preconfigured fallback threshold, a state transition to CONNECTED state indication received from an upper layer of the UE, a maximum number of new transport block (TB) transmission is reached when a L2 buffer is not empty.

12. The method of claim 11, wherein the command from the wireless network is an RRCResume message.

13. The method of claim 1, further comprising performing a state transition from the INACTIVE state to an IDLE state upon detecting one or more preconfigured failure conditions.

14. The method of claim 13, wherein the one or more preconfigured failure conditions comprise an random access (RA) failure, a radio link control (RLC) failure, and detection of one or more physical problems.

15. A user equipment (UE) comprising:

a radio frequency (RF) transceiver that transmits and receives radio signals in a wireless network;

a state control module that initiates one or more data transmissions in a UE INACTIVE state in the wireless network;

an access stratum (AS) context module that restores an INACTIVE AS context stored in the UE, wherein the INACTIVE AS context comprises a set of parameters configured for data transmission in the INACTIVE state, which includes physical layer and MAC layer configurations;

an inactive state control module that performs the one or more data transmissions in the UE INACTIVE state based on the INACTIVE AS context, wherein the one or more data transmissions uses one or more radio bearers (RB) selecting at least one from one or more dedicated RBs (DRBs) and one or more signaling RBs (SRBs), wherein the set of parameters including the physical layer and MAC layer configurations are applied in response to initiating the one or more data transmissions in the UE INACTIVE state; and a transmission control module that stops the data transmission in the UE INACTIVE state upon detecting one or more preconfigured suspension conditions.

16. The UE of claim 15, wherein the initiating data transmission in the INACTIVE state is triggered by a resume request from a non-access stratum (NAS) layer when an amount of data to be transmitted is lower than a preconfigured small-data threshold.

17. The UE of claim 15, wherein the performing the one or more data transmissions involves a resource procedure selecting from a random access (RA) procedure, using a preconfigured UL resources of a configuration grant (CG) procedure, and monitoring physical downlink control channel (PDCCH) addressed to cell radio network temporary identifier (C-RNTI) procedure.

18. The UE of claim 15, wherein the one or more preconfigured suspension conditions comprise receiving a command from the wireless network indicating a suspension of the one or more DRBs, a layer-2 (L2) buffer is empty, a suspension indication received from an upper layer of the UE, an expiration of a data-inactivity timer, a maximum number of new transport block (TB) transmission is not reached when a L2 buffer is empty.

19. The UE of claim 15, further comprising performing a state transition from the INACTIVE state to a CONNECTED state upon detecting one or more preconfigured fallback conditions, and wherein the one or more preconfigured fallback conditions comprise receiving a command from the wireless network to go to CONNECTED state, an amount of continuous data packets arrival exceeds a preconfigured fallback threshold, a state transition to CONNECTED state indication received from an upper layer of the UE, a maximum number of new transport block (TB) transmission is reached when a L2 buffer is not empty.

20. The UE of claim 15, further comprising performing a state transition from the INACTIVE state to an IDLE state upon detecting one or more preconfigured failure conditions, and wherein the one or more preconfigured failure conditions comprise an RA failure, an RLC failure, and detection of one or more physical problems.

* * * * *